United States Patent
Mukherjee et al.

(10) Patent No.: US 9,137,519 B1
(45) Date of Patent: Sep. 15, 2015

(54) GENERATION OF A STEREO VIDEO FROM A MONO VIDEO

(75) Inventors: Debargha Mukherjee, Sunnyvale, CA (US); Chen Wu, Mountain View, CA (US)

(73) Assignee: Google Inc., Mountain View, CA (US)

(*) Notice: Subject to any disclaimer, the term of this patent is extended or adjusted under 35 U.S.C. 154(b) by 506 days.

(21) Appl. No.: 13/343,245

(22) Filed: Jan. 4, 2012

(51) Int. Cl.
H04N 13/00 (2006.01)
H04N 15/00 (2006.01)
H04N 13/02 (2006.01)

(52) U.S. Cl.
CPC ............................. *H04N 13/026* (2013.01)

(58) Field of Classification Search
CPC .............. G06K 2209/40; G06T 2207/10012; H04N 13/026
USPC ............................................................ 348/44
See application file for complete search history.

(56) References Cited

U.S. PATENT DOCUMENTS

| | | | |
|---|---|---|---|
| 5,805,733 A | 9/1998 | Wang et al. | |
| 6,124,925 A * | 9/2000 | Kaneko et al. | 356/237.1 |
| 7,352,386 B1 * | 4/2008 | Shum et al. | 348/42 |
| 2004/0027346 A1 * | 2/2004 | Naske | 345/419 |
| 2006/0098253 A1 * | 5/2006 | Masuno et al. | 358/518 |
| 2007/0024614 A1 | 2/2007 | Tam et al. | |
| 2008/0150945 A1 * | 6/2008 | Wang et al. | 345/427 |
| 2008/0247670 A1 * | 10/2008 | Tam et al. | 382/298 |
| 2009/0041339 A1 * | 2/2009 | Yamada et al. | 382/154 |
| 2009/0116732 A1 * | 5/2009 | Zhou et al. | 382/154 |
| 2010/0141757 A1 | 6/2010 | Baik et al. | |
| 2011/0026840 A1 * | 2/2011 | Tao et al. | 382/224 |
| 2011/0081042 A1 | 4/2011 | Kim et al. | |
| 2011/0096832 A1 | 4/2011 | Zhang et al. | |
| 2011/0122225 A1 * | 5/2011 | Kim et al. | 348/42 |
| 2011/0158504 A1 * | 6/2011 | Turner et al. | 382/154 |
| 2011/0298898 A1 | 12/2011 | Jung et al. | |
| 2012/0113227 A1 * | 5/2012 | Paik et al. | 348/46 |
| 2012/0154551 A1 * | 6/2012 | Inoue | 348/49 |
| 2012/0162200 A1 | 6/2012 | Mishima et al. | |
| 2012/0257815 A1 | 10/2012 | Schlosser et al. | |
| 2012/0269424 A1 * | 10/2012 | Ebata et al. | 382/154 |
| 2013/0038600 A1 | 2/2013 | Wang | |
| 2013/0044254 A1 | 2/2013 | Tzur | |
| 2014/0098100 A1 | 4/2014 | Dane et al. | |

OTHER PUBLICATIONS

Bourge, A., et al., (eds.) "ISO/IEC CD 23002-3 Auxiliary Video Data Representation," International Organisation for Standardisation, ISO/IEC JTC 1/SC 29/WG 11/N8038, Coding of Moving Pictures and Audio, Apr. 2006, 24 pages.

(Continued)

*Primary Examiner* — Jeremaiah C Hallenbeck-Huber
(74) *Attorney, Agent, or Firm* — Fenwick & West LLP

(57) ABSTRACT

A system and methodology provide for generation of a stereo video from a mono video. A mono video is partitioned into shots, where each shot including one or more frames of the mono video. The mono video frames are used as the left frames in the stereo video. Depth parameters are determined for each shot. A pixel depth map is created for each frame of each shot. The right frames for the stereo video are created by shifting pixels from the left frames laterally to occupy new locations in the right frames. A pixel's shift is based on the depth parameters and the pixel depth. In aggregate, pixel shifts will cause objects to appear in different locations in the right frame relative to where they appeared in the left frame. The effect upon the viewer is that the stereo video will provide an enhanced illusion of depth for the viewer.

21 Claims, 5 Drawing Sheets

(56) References Cited

OTHER PUBLICATIONS

Tam, W.J., et al., "Three-dimensional TV: A novel method for generating surrogate depth maps using colour information," Proceedings of SPIE-IS&T Electronic Imaging, Steoreoscopic Displays and Applications XX, vol. 7237, 72371A, 2009, 9 pages.

PCT International Search Report and Written Opinion for PCT/IB2013/059733, Feb. 25, 2014, 7 Pages.

* cited by examiner

GENERATION OF A STEREO VIDEO FROM A MONO VIDEO

BACKGROUND OF THE INVENTION

1. Field of the Invention

The present application is related to video processing, more particularly, to stereo video processing.

2. Description of the Background Art

Stereo or "3D" videos enhance the illusion of depth perception by simulating stereopsis, thereby creating the illusion of depth through the simulation of parallax. One aspect holding back the widespread adoption of stereo videos, however, is the availability of videos in a stereo format. Traditionally, the primary way to generate stereo videos was to film in stereo using two different cameras angled from different points of view to capture depth information. Due to the difficulty and expense associated with filming in stereo, comparatively few stereo videos have been generated to date.

Further, although it is currently possible to create a stereo video out of a mono video, existing techniques are not very robust. Existing techniques compute motion of objects between video frames to determine what objects in the frame to project or recess relative to the display surface. These motion-based techniques, however, have difficulty determining the boundaries of objects. As a consequence, incorrect object segmentation occurs, where part of an object appears projected or recessed, and another part does not. Visually, such segmentation disrupts the depth illusion effect, making it difficult for a viewer to discern what objects in the frame are projected and what objects are recessed. As a consequence existing techniques for generating stereo video out of mono video are generally not able to create stereo videos that depict the depth of objects in the frame in a consistent and accurate manner.

SUMMARY OF THE INVENTION

A system and methodology provide for generation of stereo (or 3D) videos from mono videos. To generate the stereo video, the mono video is partitioned into shots of multiple frames, and a set of depth parameters are determined for each shot. The depth parameters for a given shot approximate the expected depth of the closest and furthest objects in the shot as a multiple of the screen width. The depth parameters further include a pixel depth map for each frame in the shot, where pixel depth is a measure of the amount by which a pixel is to be projected or recessed relative to the display surface. The determination of pixel depth is based on the YCbCr color components of the pixel. Pixel depths may be corrected to take into account saturation and gamma differences between pixels and/or frames.

The shot depth parameters and pixel depth maps are used to create a second, right frame for each corresponding original left frame of the mono video. Right frames are created by shifting pixels from the corresponding left frame laterally to occupy new locations in the right frame. The amount each pixel is shifted is based on the shot depth parameters and its pixel depth. In aggregate, the pixel shifts cause objects to appear in different locations in the right frame relative to where they appeared in the left frame. The effect upon the viewer of the stereo video is that objects will appear recessed or projected forward, depending upon pixel shifting between the left and right frames.

Stereo video generation may incorporate a number of additional features to improve the quality of the stereo video. For example, the pixel depth maps may be created using the same process for all types of shots. Alternatively, each shot may be passed through a scene classification module which identifies the scene type of the shot, for example indoor, outdoor, long, full, medium, or closeup. Classification by scene type allows the depth parameters and pixel depth maps for each shot to be determined differently depending upon on scene type. For example, the depth parameters for an outdoor type shot may be determined differently than for an indoor type shot, resulting in greater pixel shifting for outdoor scenes, relative to indoor scenes, for example.

Additionally, the shifting of pixels to create the appearance of depth in a right frame may cause some empty pixels in the right frame. To improve the quality of the right frame, these empty pixels may be filled by interpolation based upon the surrounding pixels. In another example, stereo video frames are generated by first upsampling the left frames. The right frames are then generated using the upsampled left frames. Once the right frames have been generated, the stereo and left frames are downsampled to create the stereo video. Generating the stereo video using upsampled frames allows for finer granularity in pixel shifting, thereby smoothing edges of shifted objects in the right frames and improving the quality of the stereo video.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
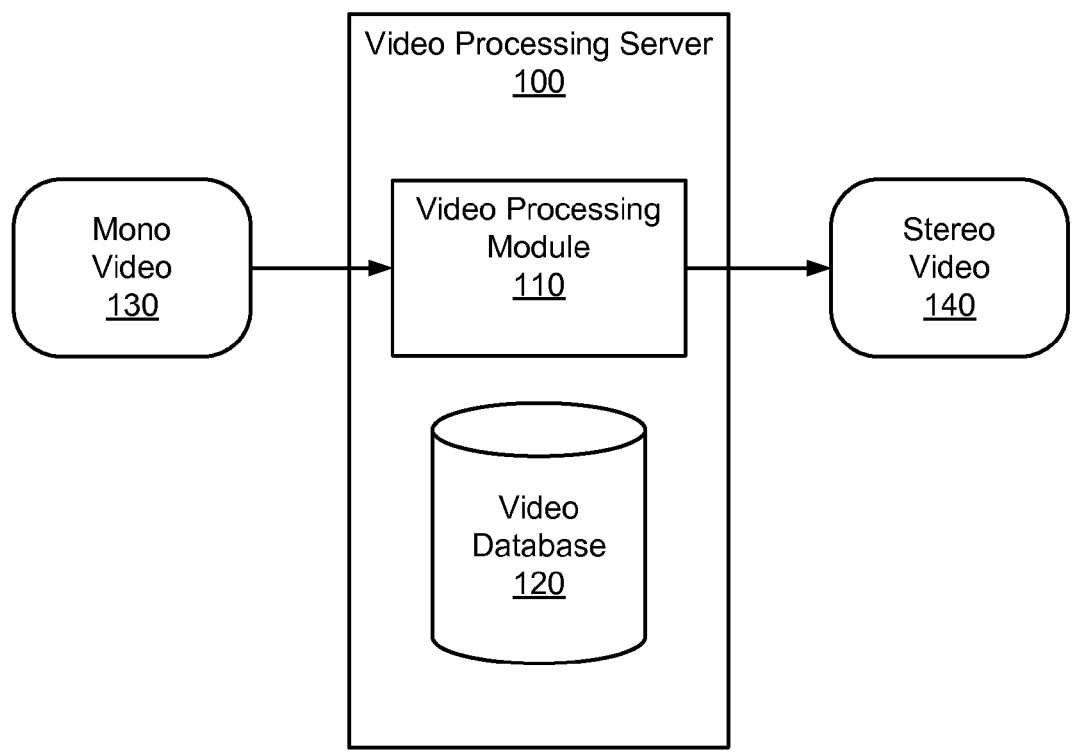
FIG. 1 is a high-level block diagram of a video processing server according to one embodiment.

FIG. 1 is a high-level block diagram of an video processing server 100 according to one embodiment. The server 100 includes a video processing module 110 and a video database 120. Only one server 100, video processing module 110, and video database 120 are shown in FIG. 1 in order to simplify and clarify the description, but in practice there can be multiple ones of these entities in a given server. Moreover, the entities can be distributed across multiple machines. For example, the video processing module 110 and database 120 can be distributed across multiple servers, coupled together over a network.

The video database 120 stores mono and stereo (or "3D") videos. A mono video comprises a plurality of mono video frames. A stereo video is derived from a mono video and comprises a plurality of pairs of video frames. Each pair includes a left frame, and a right frame. The left frame is a frame from a mono video from which the stereo video is derived, and the right frame is a frame that is derived from the left frame. The opposite arrangement is also contemplated, where the right frame is a frame from a mono video from which the stereo video is derived, and the left frame is derived from a right frame. When viewed on specialized 3D displays (and/or with specialized 3D glasses) the right and left frames from a stereo video are displayed so as to create the visual illusion of depth for the viewer. An individual frame (i.e., a 2D image) comprises a two-dimensional array of pixels. A particular color of a pixel (x,y) may be defined in either the RGB or YCbCr color spaces. In one embodiment, the left and right frames of the stereo video are sampled in size to be half the width of the mono video frames.

The videos in the video database 120 may be obtained from a variety of sources. For example, videos may be obtained from user, e.g., as submitted by a user uploading a videos to a video repository or video hosting website such as YOU-TUBE.

The video processing module 110 processes a mono video 130 to generate a stereo video 140. To generate a stereo video 140, the video processing module 110 identifies each shot in the video, and determines shot depth parameters for each shot. Shots are groups of contiguous frames that have substantially consistent visual characteristics. The video processing module 110 also creates a pixel depth map for each frame in the video. The shot depth parameters and pixel depth maps are used to generate a right frame for each left frame in the video. Each right frame is generated by shifting the pixels from its corresponding left frame based on the shot depth parameters from the shot that includes the left frame, and based on the pixel depth map of the left frame. The video processing module 110 is described in further detail below.

Figure 2:
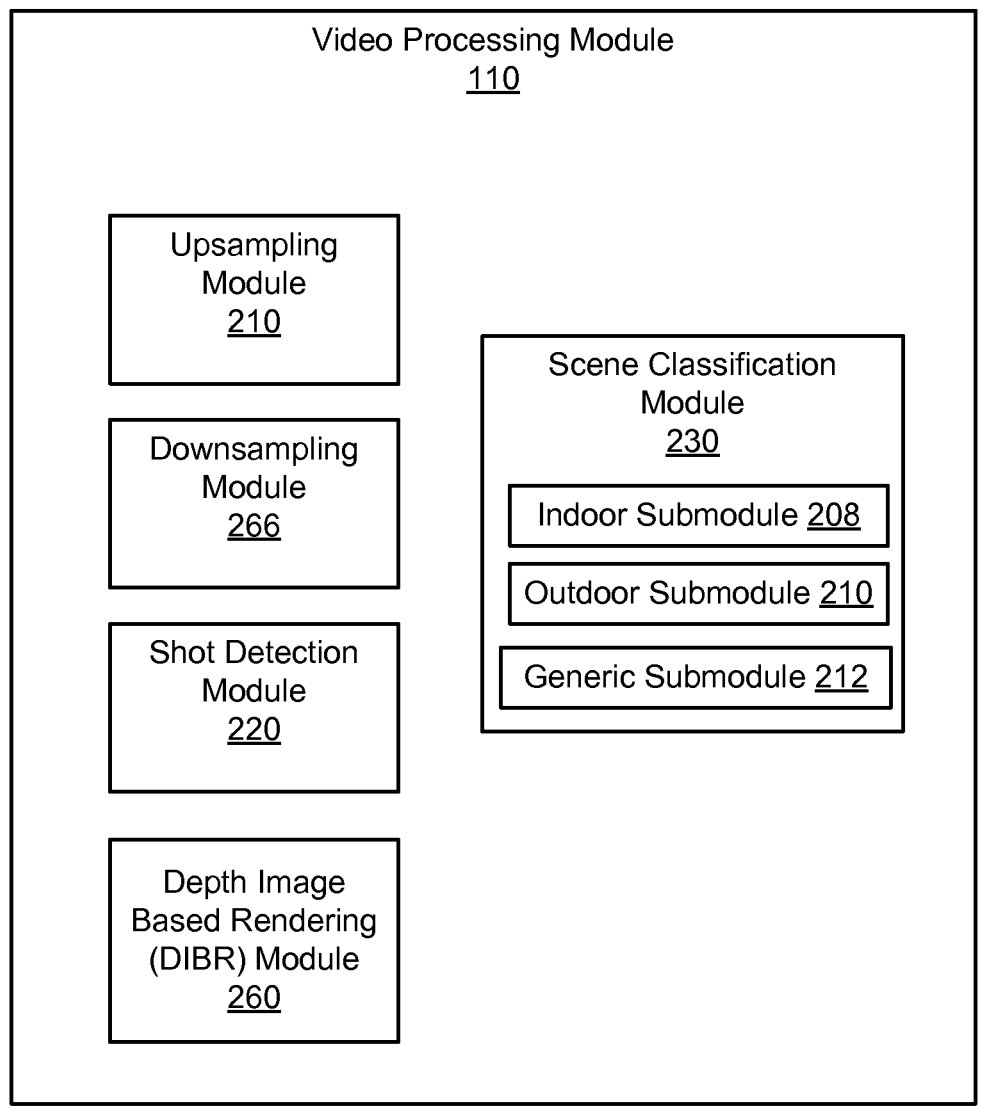
FIG. 2 is a block diagram of a video processing module according to one embodiment.

FIG. 2 is a block diagram of a video processing module according to one embodiment. The video processing module 110 comprises an upsampling module 210, a downsampling module 266, a shot detection module 220, a scene classification module 230, and a depth image based rendering (DIBR) module 260. Alternative embodiments of the video processing module 110 have different and/or additional modules than the ones described here. Similarly, the functions can be distributed among the modules in a different manner than is described here.

The video processing module 110 partitions the frames of a video into a number of shots using the shot detection module 220, and then generates depth parameters for each shot and pixel depth maps for each frame using the scene classification module 230. The depth parameters, herein called $K_{near}$ ands $K_{far}$, indicate approximations as to the depth of the shot in terms of a distance normal to the frame (i.e., towards or away from a viewer relative to the surface of a video display) between the expected closest objects in the shot ($K_{near}$) and the expected furthest objects in the shot ($K_{far}$). The depth parameters $K_{near}$ and $K_{far}$ can be expressed as a multiple of the screen width. The pixel depth maps indicate, on a pixel by pixel basis, the amount the pixel should be projected or recessed towards or away from the viewer relative to the surface of the video display.

The DIBR module 260 uses the depth parameters and pixel depth maps to create a right frame by shifting pixels from the left frame based on the depth of underlying shot and the individual pixel depths. The right frame will ultimately look like a version of left frame with various ones of the pixels laterally shifted, that when viewed together with the left frame create the illusion of depth for the viewer.

Shot Detection

Shot detection identifies shots, where shots are groups of contiguous frames that have substantially consistent visual characteristics, such as color, motion, luminance, edges, phase, field of view, object location, or the like. By partitioning the frames of the video into shots, the video processing module 110 is able to determine visual characteristics that are at least roughly consistent in each shot, e.g., in groups of sequential frames. Determination of these shot characteristics improves the ability of the video processing module 110 to determine how far to project or recess pixels in the frame, thereby improving the quality of the generated right frame.

The shot detection module 220 processes the frames of the mono video sequentially, beginning with the first frame, and determines, for each frame of the video, whether a given frame is part of a current shot, or whether it is the start of a new shot. The shot detection module 220 outputs a listing of shots, each shot indicated by the frame number (or time) of the first frame in the shot, and the number of frames in the shot, or alternatively, the frame number (or time) of the last frame in the shot.

The shot detection module 220 determines whether a given frame F is a part of the current shot S by analyzing the differences between the given frame F and the previous frame F−1 in the video. The shot detection module 220 maintains a buffer with a color histogram of two or more frames to assist in determining which shot the frame is a part of. For example, the color histogram may consist of a reasonably sized three dimensional histogram that bins the colors of each frame, for example 4 bits for each of the Y, Cb, and Cr color components of the pixels of the frame. The determination is made by comparing the color histogram distance between the given frame and the earliest frame in the frame buffer. If the difference between the color histogram distance in a given frame and the earliest frame in the frame buffer is less than a threshold, than the given frame is determined to be part of the current shot S. If the color histogram distance is above the threshold, the given frame is determined to be the first frame in a new shot S+1. In one embodiment, the determination is made by computing the Hellinger distance between the color histogram of the given frame and the earliest frame in the frame buffer, where the threshold in the Hellinger distance computation is 0.5.

Once a new shot is identified, the number of frames in the current shot S are compared against the buffer size (in terms of frame count). If a given shot has fewer frames than the size of the buffer, additional frames are added to the shot to ensure that the shot has sufficient frames for processing. Frames are added until the shot has at least as many frames as the buffer size. The added frames may be frames that precede or follow the frames of the shot. This helps ensure that each shot will have sufficient frames for processing by the scene classification module 230.

Although a specific implementation for shot detection is described above, any similar algorithm may be used. For example, U.S. Pat. No. 5,805,733, the content of which is incorporated herein by reference in its entirety, describe similar algorithms based on histogram analysis. Additionally, any algorithm related to shot detection or scene change may be used in place of the algorithm above in order to obtain the same results. Multiple algorithms may be combined in a voting scheme such that the determination that a frame is part of new shot may be determined when some or all of a plurality of algorithms agree. For example, separate algorithms that detect scene changed based on color analysis, motion analysis, and phase may be combined in a voting scheme.

Scene Classification

The scene classification module 230 is used to determine a type of scene for a shot, for example whether the shot is of an indoor scene, outdoor scene, closeup, long, pan, sports, nature, music, or people-oriented shots. The scene classification module 230 takes a shot, including the frames of a shot, as an input. Based on the type of scene of the shot, the scene classification module 230 generates a pixel depth map for each frame in the shot. The scene classification module 230 performs saturation correction and gamma correction as part of the generation of the pixel depth map. Additionally, the scene classification module 230 determines depth parameters for each shot in a video. The scene classification module 230 is configured to output the pixel depth maps and depth parameters.

The scene classification module 230 can be configured to produce a single set of depth parameters for the entire shot, or alternatively configured to produce a set of depth parameters for each frame in a shot. The processing by the scene classification module 230 can occur immediately after each shot is identified, after some set number of shots are identified, after all shots are identified, or based on other factors, such as available memory.

In one embodiment the scene classification module 230 includes a number of submodules for determining a type of scene for a shot, and processing shots of that scene type to generate the depth parameters and depth maps. The depth maps and depth parameters generated by each submodule will be different, based on the differences between the submodules. Submodules may use different processes from one another for generating the depth maps and depth parameters, or submodules may vary with respect to fixed variables that affect the generated depth maps and depth parameters. For example, each submodule may use a different saturation threshold Ts to perform a different amount saturation correction to generate the depth maps. Scene type submodules include, for example, an outdoor submodule 208 that is configured to process outdoor scenes, and an indoor submodule 210 that is configured to process indoor scenes.

The scene classification module 230 passes several initialization frames from the shot to the submodules to determine which submodule is best configured to process the shot. In one embodiment, the initialization frames include the first frame of the shot, and N additional frames that precede the first frame in the shot, where N is less than or equal to the shot buffer size W. In another embodiment, the initialization frames include N frames from the shot, where N is less than or equal to W.

Each submodule includes a qualifier function that determines from the initialization frames whether the shot is of the type of scene that is processed by that submodule. In the event that none of submodules indicate that the initialization frames match the module's scene type, the show is processed by a generic submodule 212 that processes shots that are not processed by any of the other submodules. In one embodiment, all shots are processed by the generic submodule 212.

The generic submodule 212 generates depth parameters and pixel depth maps using a color-based model. The color-based model generates pixel depth maps based on a determination that pixels with more red are more often associated with objects in the frame that are closer to the front compared to other objects. In contrast, pixel with more blue are more often associated with objects in the frame that are closer to the back compared to other objects. The generic submodule 212 uses the blue (Cb) and red difference (Cr) component in each pixel to calculate a depth for each pixel. In one embodiment, if the pixel depth is negative or less than one, then the pixel is closer to the front of the frame, and if the pixel depth is a larger than one, then the pixel is further to the back of the frame.

Pixel depth is determined using a color depth function that is a linear combination of the Cb and Cr components. For example, the color depth function may be weighted such that a larger Cb component will result in a larger pixel depth, and a larger Cr component will result in smaller or negative pixel depth. For example, the pixel depth D may be represented by a pixel depth function having the general form:

$$D = \alpha(Cb) + (1-\alpha)(\beta - Cr)$$

where $\alpha$ and $\beta$ are derived from the pixels of the frames of the shot. The value $\beta$ represents the size of the range of possible values for Cb and Cr. For example, if Cb and Cr may have any value between 0 and 255, $\beta$ equals 255.

To determine $\alpha$, the generic submodule 212 performs a principal component analysis that determines a direction of maximum spread within a shot between the difference components Cb and Cr of the pixels of the analyzed frames. Performing the principal component analysis includes analyzing one or more frames from a shot. The eigenvalue $\alpha$ has a value between 0 and 1, inclusive.

The principal component analysis includes determining, for every pixel in an analyzed image values x and y where x=Cr−128 and y=Cb−128. Three different expectations are computed, sx, sy, and sxy, $$sx = E(x^2),$$

$$sy = E(y^2), \text{ and}$$

$$sxy = E(xy),$$

where an expectation E(z) is the average value of z over all pixels in the analyzed image. If more than one image is analyzed in the principal component analysis, The expectations E( ) are averaged over all pixels from all analyzed images. The expectations sx, sy, and sxy are used to create a matrix C where $$C = \begin{bmatrix} sx & sxy \\ sxy & sy \end{bmatrix}$$

The principal component analysis determines the eigenvalues and eigenvectors of C. The principal component analysis selects the eigenvector v corresponding to the larger of the two eigenvalues. The eigenvector v is scaled so that its elements sum to 1. The elements of the scaled eigenvector v are $\alpha$ and $1-\alpha$.

The generic module 212 is further configured to determine depth parameters $K_{near}$ and $K_{far}$ for a shot it is processing. In one embodiment, the depth parameters have fixed values for all shots processed by the generic module 212, for example a $K_{near}$ of 0.5 and a $K_{far}$ of 4. In this example, the $K_{near}$ of 0.5 means that the generic module 212 is approximating that the closest thing in the frame to the viewer is half the screen width. A $K_{far}$ of 4 means that the generic module 212 is approximating that the farthest thing in the frame is four times the screen width.

The outdoor submodule 210 computes the depth parameters and pixel depth maps for shots that depict an outdoor setting. In one example, the qualification function of the outdoor submodule determines the average brightness in the upper half of the image by averaging across the Y components of the pixels in the upper portion of the frame. Determining the brightness of the upper half of the frame is a measure of whether the shot contains the open sky, which is expected to be brighter in an outdoor shot than in other kinds of shots. If the average brightness exceeds a threshold, for example 0.7, shot is determined to be an outdoor shot.

In outdoor settings, the assumption that blue colors indicate objects in the frame farther from the viewer and red colors indicate objects closer to the viewer is generally correct. Additionally, outdoor shots will typically have a higher levels of blueness/greenness compared to other types of shots, and blue/green objects typically appear in the background of frames rather than the foreground. As a consequence, in one embodiment to determine pixel depth the outdoor submodule 210 does not use a principal component analysis to determine $\alpha$ as is used by the generic submodule 212. Instead, the outdoor submodule 210 uses a pixel depth function with fixed eigenvalues. In one embodiment, the $\alpha$ for the pixel depth function is 0.25. Additionally, the depth map generation for the outdoor submodule performs saturation correction for fewer, more highly saturated pixels using a higher saturation threshold relative to the saturation threshold used the generic submodule 212.

The outdoor submodule 210 also generates depth parameters $K_{near}$ and $K_{far}$ for outdoor shots. Shots processed by the outdoor submodule 210 generally have high $K_{far}$, owing to the fact that the background of an outdoor scene is very often located at a significant distance from the viewer. In one embodiment, the $K_{near}$ for a shot processed by the outdoor submodule 210 is 0.5 and the $K_{far}$ is 6.

The indoor submodule 208 computes the depth parameters and pixel depth maps for shots that depict an indoor setting. In one example, in the same manner as in the outdoor submodule 210, the qualification function of the indoor submodule determines the average brightness in the upper half of the image by averaging across the Y components in the pixels in the upper portion of the frame. In this case, however, if the average brightness is below a second threshold, for example 0.5, the shot is determined to be an indoor shot. In indoor settings, the assumption that blue colors indicate objects in the frame farther from the viewer and red colors indicate objects closer to the viewer is correct less frequently than in outdoor settings. As a consequence, relative to the depth map generation of the generic submodule 212, the depth map generation for the indoor submodule incorporates additional saturation correction for additional highly saturated pixels using a lower saturation threshold relative to the saturation threshold used by the generic submodule 212.

The indoor submodule 208 also generates depth parameters $K_{near}$ and $K_{far}$ for indoor shots. The $K_{far}$ will generally have a $K_{far}$ value that is smaller than the equivalent $K_{far}$ that would be determined by the outdoor submodule 208, based on the assumption that indoor shots generally do not have a great deal of depth to furthest object in the shot. In one embodiment, the $K_{near}$ for a shot processed by the outdoor submodule 210 is 0.5 and the $K_{far}$ is 3.

Saturation Correction and Gamma Correction

As mentioned above, each submodule of the scene classification module 230 is configured to correct generated pixel depths for variations in gamma and saturation. Furthermore, as each submodule is configured to handle a different type of shot, each submodule may perform a different amount of saturation correction or gamma correction on the generated pixel depths. Saturation correction may be performed before or after the generation of pixel depth. Gamma correction, however, is performed after saturation correction and pixel depth generation, because the gamma correction process assumes as input a pixel depth that has already been corrected for saturation.

Saturation correction helps correct for errors in the assumed correlations between color and pixel depth by accounting for color saturation in pixels of a frame. Saturation occurs when pixels of a frame have maximum or near maximum values for the difference components Cb and Cr. When many pixels have saturated difference components, it is more difficult to determine $\alpha$ meaningful pixel depth that accurately corresponds to the relative depth of objects depicted in a frame.

In one embodiment, saturation correction is performed by adjusting the pixel depth for a pixel by a nonlinear saturation value SV. In one embodiment, the saturation value SV is determined by the saturation correction function:

$$SV=(\max(|Cb-\beta/2|,|Cr-\beta/2|))/(\beta/2)$$

where the pixel depth D is adjusted according to:

$$D'=D \text{ if } SV \leq Ts \text{ and}$$

$$D'=(1-Tm((SV-Ts)^2))(D) \text{ if } SV>Ts$$

The saturation value SV is a value between 0 and 1, where a value of 1 indicates that the pixel in question is fully saturated with respect to either Cb or Cr, and a value of 0 indicates that the pixel has no saturation, e.g., it appears in grayscale only. The variable Tm typically equals 1, or a value close to 1. Again, $\beta$ is based on the size of the range of possible values for Cb and Cr.

The pixel depth D' will remain unchanged by saturation correction if the saturation value SV is not above a saturation threshold Ts, in this example 0.5. The pixel depth D' will be modified based on the saturation value SV if the SV equals or exceeds the threshold. As a consequence, sufficiently saturated pixels will have their pixel depth reduced by the saturation value, whereas other pixels will not have their pixel depth changed. As described above with respect to each submodule and illustrated by the equation above, adjusting the saturation threshold Ts affects the number of pixels that will have their pixel depth adjusted by saturation correction.

Gamma correction increases depth contrast for better perceptual quality using the Y component of the pixel. For example, a lower Y component may indicate a darker pixel, which for gamma correction may be correlated with a higher pixel depth. In contrast, a higher luma component may indicate a brighter pixel, which for gamma correction may be correlated with a lower or negative pixel depth. In one embodiment, gamma correction is performed by adjusting the pixel depth for a given pixel by a nonlinear gamma correction function that uses the Y component of the pixel. In one embodiment, a gamma corrected pixel depth D" is given by the gamma function $$D''=GP(D'/255)^G$$

where G is gamma. G is determined by normalizing the Y component of the pixel to a value between 0 and 1. In the above function, if Y has a range of possible values between 0 and 255, G can be obtained by dividing Y by 255. GP is a gamma peak, and typically has a fixed value, for example 224. The gamma function may also include a normalization based on the Y components of the other pixels in the frame. In one embodiment, D" is an eight bit value representing the gamma corrected and saturation corrected pixel depth.

Depth Image Based Rendering

The DIBR module 260 receives a left frame, the depth parameters, and pixel depth map and generates a right frame. The right frame is generated by shifting pixels from the left frame laterally (e.g., to the left or right) in the frame to new locations based on the pixel depth of each pixel and the depth parameters. In one embodiment, the right frame is generated by first copying the left frame and then pixel shifting the pixels in the copied frame; alternatively, the right frame can be generated pixel-by-pixel from left frame and depth information.

In one embodiment, for a given pixel, the amount P of the pixel shift is determined based on a linear function that takes into account the pixel depth D", and the depth parameters Knear and Kfar. The general form of the pixel shift function is:

$$P = -x_B(N_{pix}/d)((D''/255)(K_{near}+K_{far})-K_{far})$$

Where $x_B$ represents the a typical eye separation between eyes a viewer, for example 6 cm, where d represents a typical distance between the viewer and the video display, for example 250 cm, where $N_{pix}$ represents the width of the video display in terms of the number of pixels in the horizontal (i.e., lateral) direction, for example 1024 pixels. In the pixel shift function above, the pixel depth D" is assumed to be normalized to a value between 0 and 255.

The pixel shift is preferably quantized (e.g., truncated or rounded) to an integer value. In one embodiment, pixel shift amount may be a positive or a negative integer. In a case where the left frame is the original left frame, and the right frame is the generated frame, a positive pixel shift amount indicates that a pixel will be shifted to the right the pixel shift amount in the generated right frame versus its position in the original left frame. A negative pixel shift amount indicates that a pixel will be shifted to the left the pixel shift amount in the generated right frame versus its position in the original left frame. Negative pixel shifts indicate pixels that will appear to "pop out" towards a viewer, whereas positive pixel shifts indicate pixels that will appear to recede away from a viewer.

Given the pixel shift value P for a pixel L(x,y) in the left frame L, the location of the pixel in the right frame R is determined as:

$$R(x,y)=L(x+P,y)$$

If x+P exceeds the max size of the frame in the lateral direction, the pixel is shifted out of the frame and is not displayed.

Figure 4:
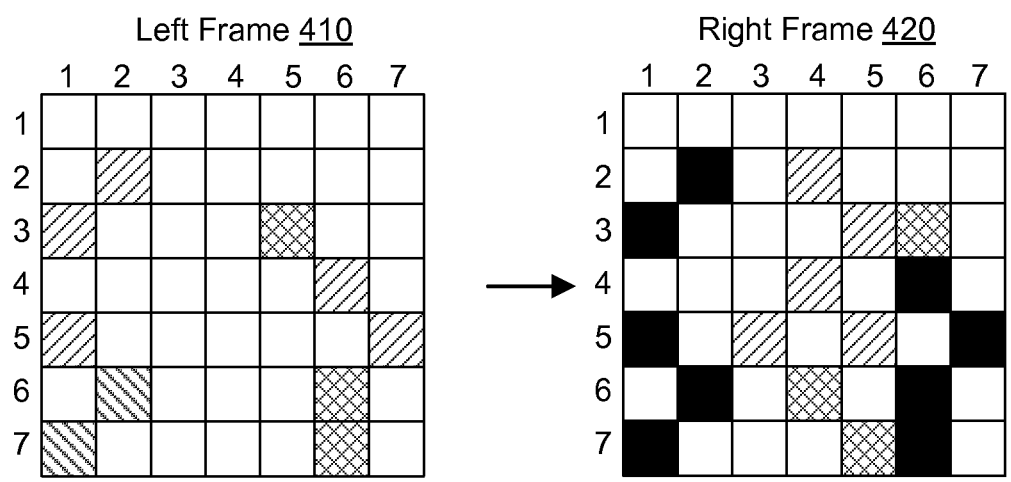
FIG. 4 is an illustration of pixel shifting between a sample left frame and a sample right frame according to one embodiment.

FIG. 4 is an illustration of pixel shifting in a sample right frame according to one embodiment. The left frame 410 represents the original left frame (in practice frames are much larger than the 7×7 frame illustrated here). The right frame 420 represents the corresponding the generated right frame. For purposes of the explanation of FIG. 4, pixels in the left frame 410 will be denoted as L(x,y), where x and y represent the represent the row and column, respectively, of the left frame 410. Pixels in the right frame 420 will be denoted as R(x,y), where x and y represent the row and column, respectively, of the right frame 420. Example pixels (e.g., pixel L(2,2)) are patterned differently to illustrate how shifting affects the positions of these pixels in the right frame.

The DIBR module 260 processes pixels in order from the upper left corner of the frame to the bottom right of the frame, proceeding on a row by row pattern. For a given pixel, the pixel shift amount represents the distance in terms of the number of pixels the given pixel will shift laterally to the left or right in the right frame relative to the left frame, as computed by the pixel shifting function P described above. For example, if pixel L(2,2) has a pixel shift of 2, in the right frame 420 it will be shifted into location R(4, 2).

Pixels may shift left as well as right. For example, if pixel L(6,4) has a pixel shift of −2, in the right frame 420 it will shift into pixel R(4, 4). If pixel L(1, 5) has a pixel shift of 2 and pixel L(7, 5) has a pixel shift of −2, these pixel will shift into pixels R(3, 5) and R(5, 5), respectively.

In the event two pixels shift into the same location (e.g., they "collide") in the right frame 420 and they have the same absolute pixel shift, the last pixel shifted from left to right will determine the color of the pixel. For example, if pixel L(2, 6) has a pixel shift of 2 and pixel L(6, 6) has a pixel shift of −2, then right frame 420 pixel R(4, 6) will have the color information from pixel L(6, 6). If the pixels are instead shifted from right to left, then the last pixel shifted from right to left will instead determine the color of the pixel.

If two pixels collide into the same location in the right frame 420 and they have different absolute pixel shifts, then the pixel with the smallest (or most negative) pixel shift will determine the color of the pixel. In this context, large negative pixel shifts (e.g., −5) are considered more negative than small negative pixel shifts (e.g., −2). For example, if pixel L(1, 7) has a pixel shift of 4 and pixel L(6, 7) has a pixel shift of −1, then right frame pixel R(5, 7) will have the color information from pixel L(6, 7).

When pixels shift, they leave behind empty pixel in the right frame containing no color information. For example, once pixel R(4,2) has been shifted, the color value at prior location of the pixel in R(2,2) is initially set to {0,0,0} (e.g., black). Empty pixels may be filled by other pixels which have also shifted. For example, if L(1, 3) has a pixel shift of 4, and pixel L(5, 3) has a pixel shift of 1, then these pixel will be shifted in the right frame to pixels R(5, 3) and R(6, 3), respectively. The empty pixel that would have been formed due to the vacancy caused by the pixel now at R(6, 3) has been filled by the shifted pixel now at R(5, 3).

Where an empty pixel is not filled by another shifted pixel, the DIBR module 260 fills the pixel by interpolating a color value for the pixel based on the colors of the pixels surrounding the pixel. In one embodiment, the interpolation uses the color values of pixels vertically and horizontally nearby to the empty pixel. Alternatively, the interpolation can use just those pixels that are vertically nearby or just horizontally nearby. The interpolation can use only immediately adjacent pixels, or pixels within some distance (e.g., with 5 pixels vertically or horizontally), and can employ either an unweighted, or weighted function (e.g., decreasing the color contribution with distance).

Upsampling and Downsampling

The quality of the right frame may be improved by increasing the resolution at which pixel shifting and interpolation is performed. In one embodiment, this is accomplished by using an upsampling module 210 to upsample the left frame prior to the determination of the depth parameters or the depth maps. The pixel shifting is then performed on the upsampled frame. Once pixel shifting and interpolation is completed, the right frame and left frame are downsampled back to their original resolution using a downsampling module 266. Upsampling and downsampling improves the granularity of pixel shifting and interpolation, decreasing the appearance of jagged edges between colors in the right frame. The upsampling module 210 and downsampling module 266 may be used at the beginning and end of the right frame generation process, respectively.

In one embodiment, the upsampling module 210 generates a higher resolution of a given frame by dividing each pixel of each frame into four subpixels, where each of the subpixels has the same color value as the original pixel. In another embodiment, the upsampling module 210 generates a higher resolution of a given frame by dividing each pixel of each frame into two subpixels laterally. For example, in the horizontal direction, the upsampled frame has twice as many pixels as it did previously, and in the vertical direction it has the same number of pixels as it had previously. The upsampling module 210 uses a interpolation filter to determine the color values of the subpixels. In one embodiment, the interpolation filter is a bilateral filter.

The downsampling module 266 performs downsampling of a video frame to generate a lower resolution version of the frame. The downsampling module 266 downsamples video frames by the same amount that the upsampling module 210 upsampled them. For left frames, the downsampling module 266 returns the frames to their original resolution prior to upsampling. For right frames, the downsampling module 266 returns the frames to the original resolution of the left frame they were generated from. In one embodiment, the downsampling module 266 further applies a smoothing function to downsampled frames in order to provide a smoother appearance to the downsampled frames. For example, the smoothing function may be a bicubic interpolation function.

Example Process

Figure 3:
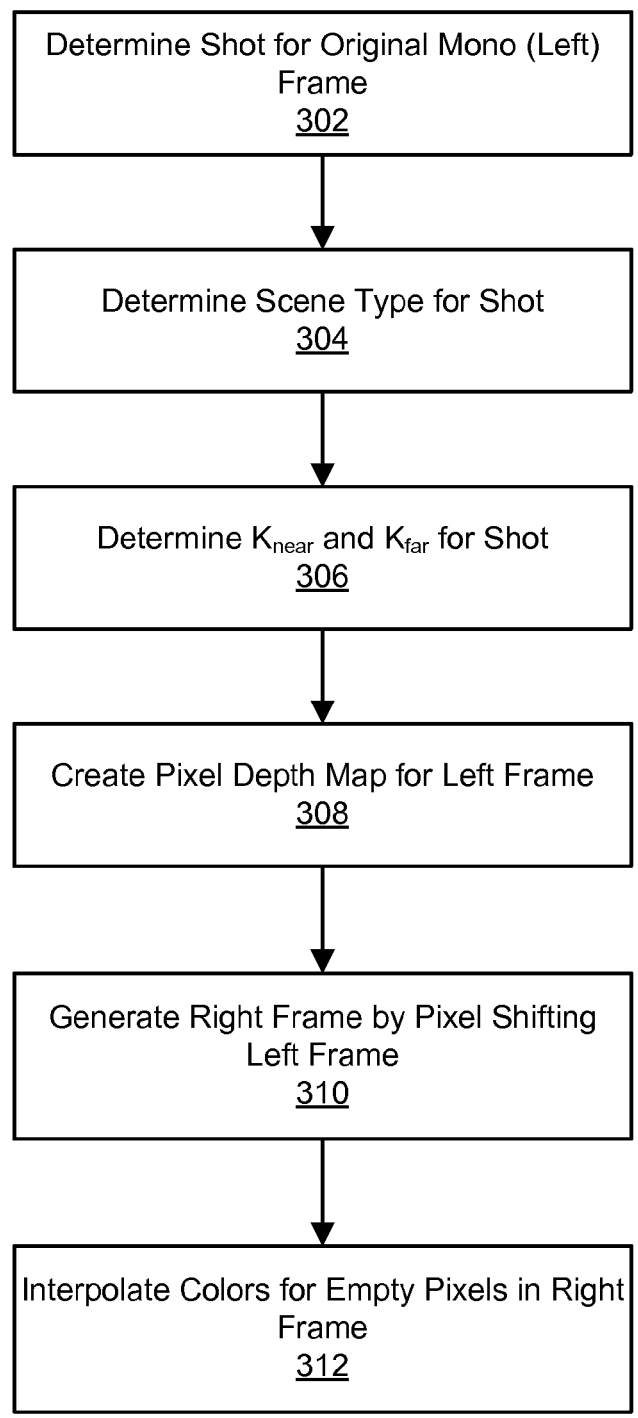
FIG. 3 is a flowchart illustrating a process for generating a right frame from a left frame according to one embodiment.

FIG. 3 is a flowchart illustrating a process for generating a right frame from a left frame according to one embodiment. In the above description of the video processing module 110, some aspects of the creation of the stereo video are described as being performed at the shot level. In other embodiments, these processes may be performed on a frame by frame basis. In the example of FIG. 3, a process is described with respect to the creation of a right frame from a left frame.

A left frame is received by a shot detection module 220. The shot detection module 220 determines 302 which shot the left frame is a part of. The scene classification module 230 determines 304 the scene type for the shot by determining which submodule, if any, the frames of the shot qualify to be processed by. If the shot does not qualify to be processed by any of the submodules, a generic submodule 212 processes the shot. Based upon the scene type determination, the appropriate submodule processes each frame to determine 306 the depth parameters $K_{near}$ and $K_f$ for the frame. The appropriate submodule also creates 308 a pixel depth map for the frame.

The left frame, depth parameters, and pixel depth map are passed to the DIBR module 260. The DIBR module 260 generates 310 the right frame by pixel shifting the left frame. The amount of the pixel shift for each pixel is based on the depth parameters and pixel depths in the pixel depth map. The DIBR module 260 also performs interpolation 312 on the right frame to fill in holes left over from pixel shifting.

Computer Architecture

Figure 5:
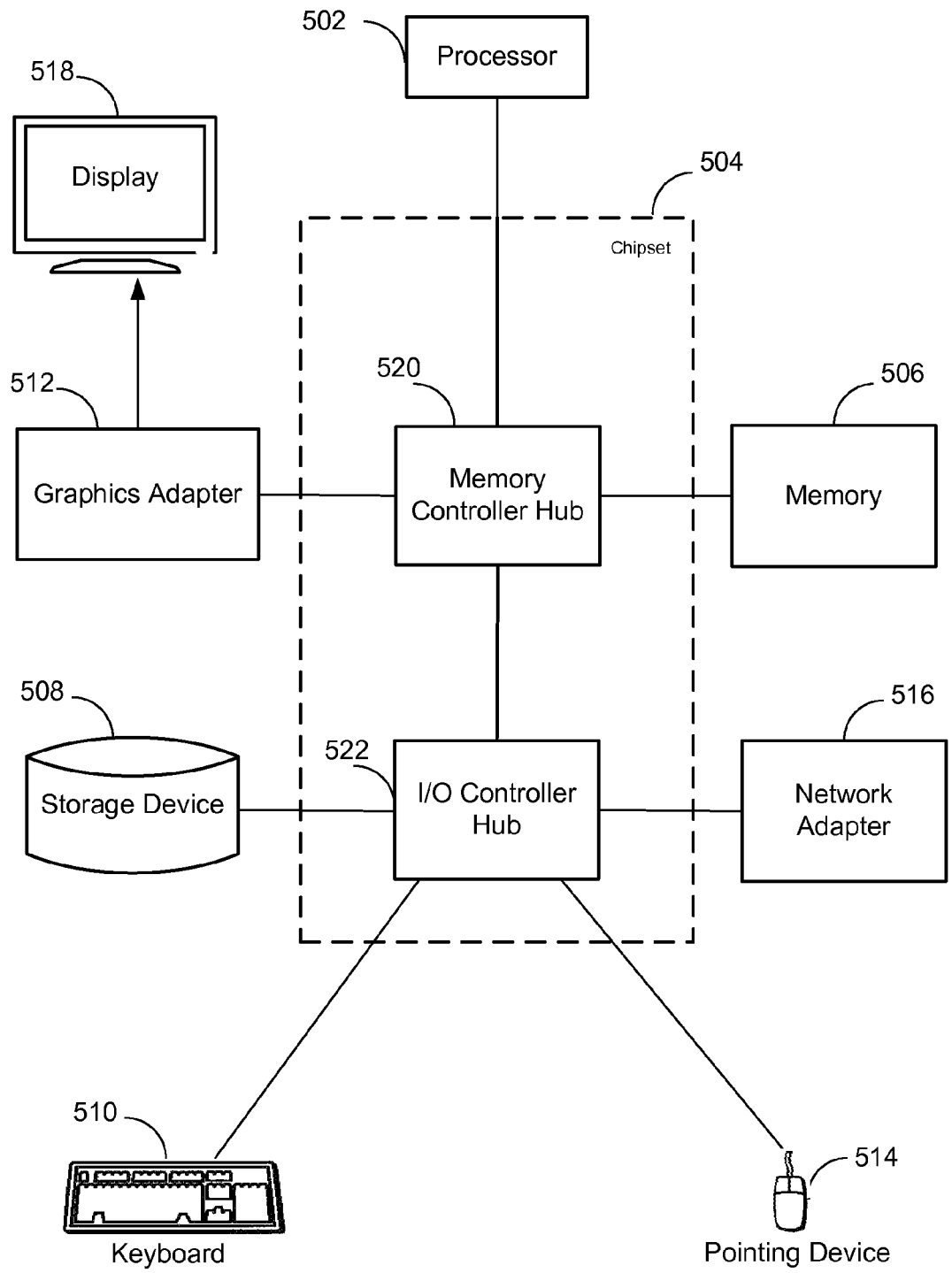
FIG. 5 is a computer system for use as a video processing server according to one embodiment.

FIG. 5 is a high-level block diagram illustrating an example of a computer 500 for use as an video processing server 100. Illustrated are at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display device 518 is coupled to the graphics adapter 512. A storage device 508, keyboard 510, pointing device 514, and network adapter 516 are coupled to the I/O controller hub 522. Other embodiments of the computer 500 have different architectures. For example, the memory 506 is directly coupled to the processor 502 in some embodiments.

The storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, or other type of pointing device, and is used in combination with the keyboard 510 to input data into the computer 500. The graphics adapter 512 displays frames and other information on the display device 518. The network adapter 516 couples the computer 500 to a network. Some embodiments of the computer 500 have different and/or other components than those shown in FIG. 5. The types of computer 500 can vary depending upon the embodiment and the desired processing power. The computer 500 may comprise multiple servers working together to provide the functionality described herein.

In some embodiments, the computer 500 may be a component of a cloud computing network.

The computer 500 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 508, loaded into the memory 506, and executed by the processor 502.

ADDITIONAL CONSIDERATIONS

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely exemplary, and not mandatory; functions performed by a single system component may instead be performed by multiple components, and functions performed by multiple components may instead performed by a single component.

Some portions of above description describe the invention in terms of algorithms and symbolic representations of operations on information. These algorithmic descriptions and representations are used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method for generating stereo video from mono video comprising:
   identifying a shot in the mono video, the shot comprising a plurality of mono frames;
   identifying a scene type for the shot, the scene type identified from one of a plurality of different scene types, each scene type associated with a different set of depth parameters, wherein each set of depth parameters comprises $K_{near}$, a numerical value representing depth scaling of a closest object in one of the mono frames to a viewer as a function of a horizontal resolution of the mono video, and $K_{far}$, a numerical value representing depth scaling of a farthest object in one of the mono frames to the viewer as a function of the horizontal resolution of the mono video;
   determining depth parameters for the shot based on the identified scene type;
   selecting a first frame from the shot to use as either a left frame or a right frame in a stereo frame pair;
   determining a pixel depth map for the first frame based on the scene type, the pixel depth map comprising a pixel depth for each pixel in the first frame; and
   generating a second frame based on the first frame, the second frame to be used as either the right frame or the left frame so as to be another frame in the stereo frame pair, comprising:
      determining a pixel shift amount for each pixel in the first frame, the pixel shift amount based on its pixel depth and the depth parameters for the shot; and
      generating a pixel in the second frame by shifting a corresponding pixel in the first frame by its pixel shift amount.

2. The method of claim 1 wherein the pixels of the mono video frame comprise YCbCr color components.

3. The method of claim 1 wherein the pixel depth is based on a red difference component and a blue difference component of the pixel.

4. The method of claim 3 wherein the pixel depth is further based eigenvalues multiplied by the red and blue difference components, wherein the eigenvalues are based on the red and blue difference components of all of the pixels of the first frame.

5. The method of claim 1 wherein the pixel depth is based on a direction of greatest spread between red difference components and blue difference components of the pixels of the first frame.

6. The method of claim 1 comprising performing saturation correction on the pixel depth map.

7. The method of claim 5 wherein the saturation correction comprises adjusting the pixel depth of a pixel based upon a saturation value of the pixel, the saturation value based on the larger of a red difference component and a blue difference component for the pixel.

8. The method of claim 5 wherein the saturation correction comprises a nonlinear function.

9. The method of claim 1 comprising performing a gamma correction on the pixel depths.

10. The method of claim 9 wherein the gamma correction comprises a nonlinear function based on a luma component of each pixel.

11. The method of claim 1 wherein responsive to a first and second pixel in the first frame being pixel shifted to a same pixel in the second frame, determining the color of the pixel in the second frame from the pixel with the smallest or most negative pixel shift amount.

12. The method of claim 1 wherein responsive to a first and second pixel in the first frame being pixel shifted to a same pixel in the second frame by a same pixel shift amount, determining the color of the pixel in the second frame from the last of the two pixels to be shifted.

13. The method of claim 1 comprising interpolating a color of an empty pixel in the second frame formed by pixel shifting based on the colors of pixels of nearby pixels.

14. The method of claim 1 comprising:
   upsampling the first frame to create an upsampled first frame prior to the determining the depth parameters for the shot and the pixel depth map for the first frame; and
   downsampling the second frame.

15. A system for generating stereo video from mono video comprising:
   a shot detection module configured to determine a first plurality of frames from a shot of a mono video, each frame of the first plurality of frames to be used as either a left frame or a right frame in a stereo frame pair;
   a scene classification module configured to:
      determine depth parameters for the shot, where the depth parameters determined for the shot are one of a plurality of different sets of depth parameters, wherein each set of depth parameters comprises $K_{near}$, a numerical value representing depth scaling of a closest object in one of the first plurality of frames to a viewer as a function of a horizontal resolution of the mono video, and $K_{far}$, a numerical value representing depth scaling of a farthest object in one of the first plurality of frames to the viewer as a function of the horizontal resolution of the mono video, and
      determine a pixel depth map for each frame of the first plurality of frames of the shot, the pixel depth maps comprising a pixel depth for each pixel in each frame of the first plurality of frames; and
   a depth image based rendering (DIBR) module configured to
      determine a pixel shift amount for each pixel in each frame of the first plurality of frames based on the depth parameters and the pixel depth maps; and
      generate a second plurality of frames based on the first plurality of frames laterally shifting the pixels of the first plurality of frames by the pixel shift amounts, each frame of the second plurality of frames to be used as either a right frame or a left frame so as to be another frame in a stereo frame pair.

16. The system of claim 15 wherein the depth parameters are the same for each frame of the first plurality of frames of the shot.

17. The system of claim 15 wherein the pixel depth is based on a red difference component and a blue difference component of the pixel.

18. The system of claim 15 wherein the pixel depth is further based eigenvalues multiplied by the red and blue difference components, wherein the eigenvalues are based on the red and blue difference components of all of the pixels of each frame of the first plurality of frames.

19. The system of claim 15 wherein the pixel depth is based on a direction of greatest spread between red difference components and blue difference components of the pixels of each frame of the first plurality of frames.

20. The system of claim 15 wherein responsive to a first and second pixel in frame of the first plurality of frames being pixel shifted to a same pixel in a frame of the second plurality of frames, determining the color of the pixel in the frame of the second plurality of frames from the pixel with the smallest or most negative pixel shift amount.

21. A method for generating stereo video from mono video comprising:
  identifying a shot in the mono video, the shot comprising a plurality of mono frames;
  identifying a scene type for the shot, the scene type is identified from one of a plurality of different scene types including at least an indoor scene type, an outdoor scene type, and a generic scene type, each of these scene types associated with a different set of depth parameters, wherein each set of depth parameters comprises $K_{near}$, a numerical value representing depth scaling of a closest object in one of the mono frames to a viewer as a function of a horizontal resolution of a mono video, and $K_{far}$, a numerical value representing depth scaling of a farthest object in one of the mono frames to the viewer as a function of the horizontal resolution of the mono video;
  determining depth parameters for the shot based on the identified scene type;
  selecting a first frame from the shot, to use as either a left frame or a right frame in a stereo frame pair;
  determining a pixel depth map for the first frame based on the scene type, the pixel depth map comprising a pixel depth for each pixel in the first frame; and
  generating a second frame based on the first frame, the second frame to be used as either the right frame or the left frame so as to be another frame in the stereo frame pair comprising:
  determining a pixel shift amount for each pixel in the first frame, the pixel shift amount based on its pixel depth and the depth parameters for the shot; and
  generating a pixel in the second frame by shifting a corresponding pixel in the first frame by its pixel shift amount.

* * * * *

UNITED STATES PATENT AND TRADEMARK OFFICE
CERTIFICATE OF CORRECTION

PATENT NO. : 9,137,519 B1
APPLICATION NO. : 13/343245
DATED : September 15, 2015
INVENTOR(S) : Debargha Mukherjee et al.

Page 1 of 1

It is certified that error appears in the above-identified patent and that said Letters Patent is hereby corrected as shown below:

In the Claims:
Column 13, line 64, Claim 4, delete "based eigenvalues", and insert -- based on eignenvalues --.
Column 15, line 10, Claim 18, delete "based eigenvalues", and insert -- based on eignenvalues --.

Signed and Sealed this
Twenty-third Day of August, 2016

Michelle K. Lee
*Director of the United States Patent and Trademark Office*